United States Patent
Takahashi

(10) Patent No.: US 7,462,408 B2
(45) Date of Patent: *Dec. 9, 2008

(54) MAGNET RECORDING MEDIUM

(75) Inventor: Kimio Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 11/117,865

(22) Filed: Apr. 29, 2005

(65) Prior Publication Data

US 2005/0196646 A1   Sep. 8, 2005

Related U.S. Application Data

(63) Continuation of application No. 10/613,156, filed on Jul. 3, 2003, now Pat. No. 6,926,975.

(30) Foreign Application Priority Data

Jul. 9, 2002  (JP)  ............................ P2002-200030

(51) Int. Cl.
*G11B 5/66* (2006.01)

(52) U.S. Cl. ...................................... 428/831; 428/837

(58) Field of Classification Search ................. 428/832, 428/837

See application file for complete search history.

(56) References Cited

U.S. PATENT DOCUMENTS

| 6,602,621 | B2 * | 8/2003 | Matsunuma et al. | ......... 428/827 |
| 6,936,340 | B2 * | 8/2005 | Jakusch et al. | .............. 428/220 |
| 2004/0241499 | A1 * | 12/2004 | Takahashi et al. | ...... 428/694 TP |
| 2005/0196647 | A1 * | 9/2005 | Takahashi | .................... 428/845 |

FOREIGN PATENT DOCUMENTS

JP    62-250515    * 10/1987

OTHER PUBLICATIONS

English abstract of JP 62-250515, Oct. 1987.*

* cited by examiner

*Primary Examiner*—Holly Rickman
(74) *Attorney, Agent, or Firm*—Rockey, Depke & Lyons, LLC; Robert J. Depke

(57) ABSTRACT

A magnetic recording medium having good corrosion resistance, electromagnetic conversion characteristics and storability is obtained. In a magnetic recording medium including a foundation layer and a magnetic layer having a thickness of 55 nm or less, which is formed by a vacuum thin film forming technique, on one principal surface of an elongate non-magnetic substrate, the foundation layer is made of a silicon nitride film having a thickness of 2 nm to 50 nm. A magneto-resistive magnetic head or a giant magneto-resistive magnetic head is slid on the magnetic recording medium so as to record and reproduce signals.

4 Claims, 4 Drawing Sheets

10

20

MAGNET RECORDING MEDIUM

The subject matter of application Ser. No. 10/613,156, is incorporated herein by reference. The present application is a continuation of U.S. application Ser. No. 10/613,156, filed Jul. 3, 2003 now U.S. Pat. No. 6,926,975, which claims priority to Japanese Patent Application No. JP2002-200030, filed Jul. 9, 2002. The present application claims priority to these previously filed applications.

CROSS REFERENCE TO RELATED APPLICATIONS

The present document claims priority to Japanese Priority Document JP 2002-200030, filed in the Japanese Patent Office on Jul. 9, 2002, the entire contents of which are incorporated herein by reference to the extent permitted by law.

BACKGROUND OF THE INVENTION

1. Field of the Invention

The present invention relates to a high-density magnetic recording medium, and in particular, to a magnetic recording medium whose recorded signals are reproduced in a system using a magneto-resistive head (MR head) or a giant magneto-resistive head (GMR head).

2. Description of Related Art

In the field of video tape recorders and the like, a so-called metal thin film type magnetic recording medium has been recently proposed to enhance image quality and increase recording density. In a metal thin film type magnetic recording medium, various types of magnetic materials such as a metal magnetic material, a Co—Ni alloy, a Co—Cr alloy and a Co—CoO metal oxide or the like may be evaporated onto a non-magnetic substrate by a vacuum thin film forming technique to form a magnetic layer. Such a metal thin film type magnetic recording medium has been put into practical use as, for example, a metal evaporated tape for high-band 8 mm video tape recorders, digital video tape recorders and the like.

A metal thin film type magnetic recording medium is superior in coercivity and squareness ratio, and since its magnetic layer can be formed extremely thin, a metal thin film type magnetic recording medium is superior in electromagnetic conversion characteristics at short wavelengths, with extremely small recording demagnetization and thickness loss upon reproduction. Moreover, unlike so-called coated type magnetic recording media, whose magnetic layer is formed of a magnetic coating in which a magnetic powder is dispersed in a binder, because a binder, which is a non-magnetic material, is not mixed in the magnetic layer, a metal thin film type magnetic recording medium has various advantages such as being able to increase the filling density of fine ferromagnetic metal particles and so forth.

Moreover, with an increased demand for magnetic recording media, such as magnetic tapes, as data streamers, a higher recording density is being demanded of magnetic recording media. Furthermore, as magnetic heads used for reproducing recorded information, magneto-resistive heads (MR heads) are beginning to see more frequent application in place of conventional inductive heads.

Since MR heads are capable of sensitively detecting an extremely small leakage flux from a magnetic layer, they are effective in achieving improvements in recording density.

Since MR heads have an upper detection limit at which its sensitivity to leakage flux saturates, and MR heads are incapable of detecting a leakage flux beyond the design thereof, in a recording medium whose recorded signals are reproduced with MR heads, its magnetic layer is required to be made thinner for purposes of optimization.

Moreover, in magnetic recording tape systems in general, when the degradation in the magnetization of a tape reaches or exceeds 16%, the amount of degradation becomes too large for sufficient reproduction signals to be obtained. Thus, such systems are designed with the assumption that the degradation in the amount of magnetization of a tape is 15% or less.

SUMMARY OF THE INVENTION

If the magnetic layer is made thinner still, however, there arises a problem in that the magnetic recording medium becomes susceptible to the effects of degradation in magnetic characteristics due to corrosion when the magnetic recording medium is stored under high-temperature and high-humidity conditions. To address this problem, in magnetic recording media such as metal evaporated tapes and the like, a protective layer made of diamond-like carbon is formed on a magnetic layer for the purpose of improving corrosion resistance and durability. A protective layer made of diamond-like carbon is superior in terms of density as compared to a protective layer made of carbon formed by way of a vacuum thin film forming technique such as sputtering, and thus has an advantage in that it is capable of drastically improving the corrosion resistance of the magnetic layer.

On the other hand, the corrosion of a magnetic layer progresses due to oxidation of magnetic metal caused by the presence of oxygen or water in the atmosphere. When the mechanism of corrosion was studied by analyzing the oxygen content distribution of a corroded magnetic recording medium sample in the thickness direction of the magnetic layer, it was found that corrosion progressed more rapidly from the side of a non-magnetic substrate as compared to the side of a surface on which a protective layer made of a diamond-like carbon film was formed. It is conceivable that this is due to the fact that non-magnetic substrates made of polyethylene terephthalate (hereinafter referred to as PET) and the like, which are used in magnetic recording media such as metal evaporated tapes, have a high permeability for oxygen or water.

In order to suppress substances such as oxygen or water that permeate non-magnetic substrates to accelerate corrosion as described above, it is effective to form a shield layer made of a metal or a metal oxide on the non-magnetic substrate so as to suppress the oxidation of the magnetic layer. However, such a shield layer has a high permeability for oxygen and water at the interface with metal particles or metal oxide particles, and it is inevitably necessary to make the thickness of the shield layer be extremely thick in order to obtain sufficient shielding effects.

However, because the shape of the surface becomes rough when the shield layer is formed thick, the surface roughness of the ultimately obtained magnetic layer also becomes greater, and there arises a problem in that the medium noise of the magnetic recording medium is increased. Moreover, there also arises a problem in that a high-density magnetic recording medium cannot be obtained.

The above-described problems become more severe when a giant magneto-resistive head (GMR head), which has higher reproductive sensitivity and is more suitable for high density recording for RF waves, is employed as a reproduction head for a magnetic recording medium in place of an MR head. This is because when a GMR head is employed, the thickness of the magnetic layer is required to be further reduced.

Moreover, since, in magnetic recording media such as evaporated tapes and the like, the thermal expansion coefficient of the metal material or the metal oxide material used in the magnetic layer or the shield layer is different from that of a resin normally used as a material for the non-magnetic substrate, cupping or curling occurs in response to the thermal history generated in the process of manufacturing the magnetic recording medium.

When cupping or curling exceeds a certain level, contact with read or write head becomes worse when used in a video tape recorder, or interference with a head protruding from a drum occurs when the tape is wound around the drum thereby causing damage to the tape edge. Therefore, it is demanded that the surface of the tape be kept in as flat a state as possible.

To this end, conventionally, a manufacturing method called hot rolling, in which a process of heating to several ten to several hundred degrees Celsius and of pressurizing is performed intentionally on the surface of the magnetic layer as one step in the process of manufacturing the magnetic recording medium, thereby preventing cupping or curling, is put into practical use.

However, although, in such a method where a thermal history is added intentionally, cupping or curling, which occurs with time, can be kept to a permissible level for practical purposes at shipping or over a period of several years from shipping, cupping or curling progresses to an impermissible level when stored over longer periods.

In view of the above-described problems, the configuration of a magnetic recording medium including a thinned magnetic layer was studied in particular, and in the present invention a magnetic recording medium for high-density recording that has superior corrosion resistance as well as durability is provided.

The present invention provides a magnetic recording medium including a foundation layer and a magnetic layer having a thickness of 55 nm or less formed through a vacuum thin film forming technique on an elongate non-magnetic substrate, wherein a signal is reproduced by sliding a magneto-resistive head or a giant magneto-resistive head on the magnetic recording medium, and in particular, the foundation layer is formed of a silicon nitride film having a thickness of 2 nm to 50 nm.

In addition, the present invention provides a magnetic recording medium including a magnetic layer having a thickness of 55 nm or less formed through a vacuum thin film forming technique on a principal surface of an elongate non-magnetic substrate, and a back foundation layer on a principal surface of the elongate non-magnetic substrate on the side opposite the magnetic layer, wherein a signal is reproduced by sliding a magneto-resistive head or a giant magneto-resistive head on the magnetic recording medium, and in particular, the back foundation layer is formed of a silicon nitride film.

According to an embodiment of a magnetic recording medium of the present invention, by having a silicon nitride film of a thickness of 2 nm to 50 nm formed as a foundation layer for a magnetic layer, corrosion resistance can be improved without degrading electromagnetic conversion characteristics.

Furthermore, according to an embodiment of a magnetic recording medium of the present invention, by having a back foundation layer made of a silicon nitride film of a thickness of 2 nm to 200 nm formed on a principal surface of a non-magnetic substrate on a side opposite a surface on which the magnetic layer is formed, corrosion resistance and storability can be improved without degrading electromagnetic conversion characteristics. Therefore, a magnetic recording medium in which the change in shape after long-term storage is extremely small, and which has extremely high stability can be obtained.

According to an embodiment of the present invention, in a magnetic recording medium for high-density recording having a magnetic layer of a thickness of 55 nm or less formed through a vacuum thin film forming technique on a principal surface of a non-magnetic substrate, by adopting a configuration in which a foundation layer made of a silicon nitride film having a thickness of 2 nm to 50 nm is formed between the magnetic layer and the non-magnetic substrate, corrosion resistance of the magnetic recording medium can be improved without degrading electromagnetic conversion characteristics. As a result, for example, a magnetic recording medium for high density recording, which is suitable for various magnetic recording tape systems, such as tape streamers and the like, and is excellent in storage stability, can be provided.

Moreover, a magnetic recording medium according to an embodiment of the present invention realizes remarkable improvements in corrosion resistance while having a thin magnetic layer. Therefore, the magnetic recording medium is suitable for use with an MR head or a GMR head having high reproductive sensitivity.

Moreover, according to an embodiment of the present invention, in a magnetic recording medium including a magnetic layer having a thickness of 55 nm or less formed through a vacuum thin film forming technique on a principal surface of a non-magnetic substrate, by adopting a configuration in which a back foundation layer made of a silicon nitride film having a thickness of 2 nm to 200 nm is formed on a surface of the non-magnetic substrate opposite the surface on which the magnetic layer is formed, corrosion resistance of the magnetic recording medium can be improved while reducing degradation in electromagnetic conversion characteristics. At the same time, dimensional changes after long-term storage can be reduced, thereby improving storability.

As a result, for example, a magnetic recording medium for high density recording, which is suitable for various magnetic recording tape systems, such as tape streamers and the like, and which is superior in terms of storability, can be provided.

DESCRIPTION OF THE PREFERRED EMBODIMENTS

Although specific embodiments of a magnetic recording medium according to the present invention will be described hereinafter, the present invention is not limited to the following examples.

Figure 1:
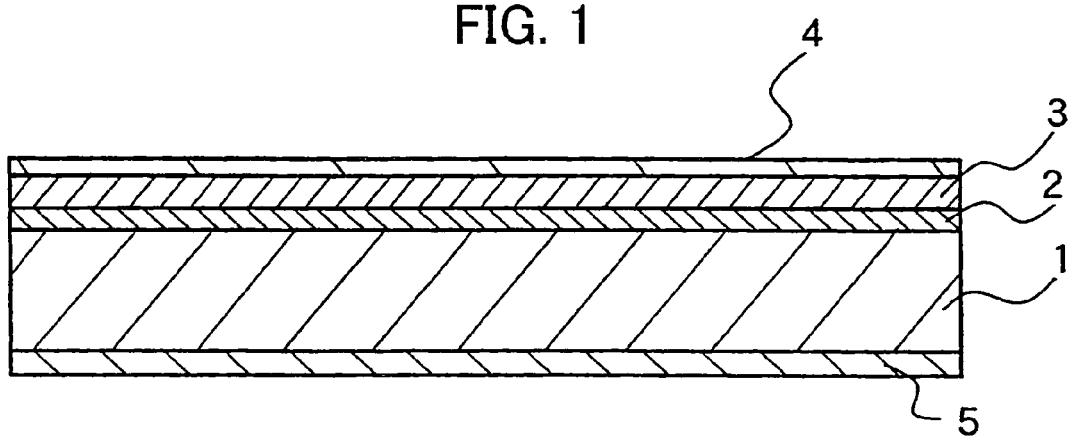
FIG. 1 is a schematic configuration diagram of an example of a magnetic recording medium according to the present invention.

A schematic sectional view of an example of a magnetic recording medium 10 according to the present invention is shown in FIG. 1.

The magnetic recording medium 10 includes an elongate non-magnetic substrate 1, and on this non-magnetic substrate 1 are formed successively a foundation layer 2, a magnetic layer 3 and a protective layer 4. A back coating layer 5 is formed on a principal surface on a side opposite the side on which the magnetic layer 3 is formed.

The magnetic recording medium 10 of the present invention is used, in particular, in a sliding state in relation to a magneto-resistive head (MR head) or a giant magneto-resistive head (GMR head). "Sliding state" of the magnetic head refers to a case where only the MR head or the GMR head is in a sliding movement, where only the magnetic recording medium according to the present invention is in a sliding movement relative to the MR head or the GMR head, or where both the MR head or the GMR head and the magnetic recording medium according to the present invention are in a sliding movement.

Hereinafter, each of the layers constituting the magnetic recording medium 10 will be described.

For the non-magnetic substrate 1, any known materials that are ordinarily used as a substrate of this type of magnetic recording medium may be applied. Examples of such materials include polyesters such as polyethylene terephthalate (PET) and polyethylene naphthalate (PEN), polyolefins such as polyethylene and polypropylene, cellulose derivatives such as cellulose triacetate, plastics such as polycarbonate, polyimide, polyamide and polyamide-imide, and the like.

On the side of the non-magnetic substrate 1 on which the magnetic layer 3 is formed, a coating layer (not shown) may be formed using a coating containing a binder resin, a filler and a surfactant. The formation of such a coating layer allows for the addition of fine bumps and dents to the surface and an improvement in mechanical strength.

As a binder resin for this coating layer, an aqueous polyester resin, an aqueous acrylic resin, an aqueous polyurethane resin or the like can be used, for example.

As a filler, silicon dioxide, calcium carbonate, particles made of a heat-resistant polymer or the like can be used.

It is preferred that the mean particle diameter of the filler contained in the coating layer be 5 to 30 nm and that the density of surface protrusions formed with the filler be about 500,000 to 30,000,000/mm$^2$. With these values, durability and electromagnetic conversion characteristics can be improved.

The foundation layer 2 is made of a silicon nitride film having a thickness of 2 nm to 50 nm.

The foundation layer 2 serves as a shield layer for preventing the corrosion of the magnetic layer 3 described below, and is formed by a vacuum thin film forming technique.

Examples of vacuum thin film forming techniques include so-called physical vapor deposition (PVD) methods such as sputtering and reactive sputtering. In sputtering, glow discharge is caused in an atmosphere, whose main component is argon, so as to sputter the surface atoms of a target made of silicon nitride with the generated argon ions. In reactive sputtering, glow discharge is caused in an atmosphere, whose main components are argon and nitrogen, so as to sputter and nitride the surface atoms of a target made of silicon with the generated argon and nitrogen ions. PVD methods are advantageous in that film formation is easy and in that they have good film forming properties.

Alternatively, the foundation layer 2 can also be formed by a chemical vapor deposition (CVD) method using, for example, a plasma CVD continuous film formation device.

As a CVD method, any conventionally known methods such as a mesh electrode DC plasma method, an electron beam excitation plasma source method, a cold-cathode ion source method, an ion vapor deposition method, and a catalytic CVD method may be used. The mesh electrode DC plasma method is advantageous in that it has superior film growth rate, although this method requires the formation of an electrode layer on the non-magnetic substrate 1 so as to allow a film forming current to flow. On the other hand, the electron beam excitation plasma source method, the cold-cathode ion source method, the ion vapor deposition method, and the catalytic CVD method mentioned above are advantageous in that the formation of an electrode layer is not required and in that the foundation layer 2 can be formed directly on the non-magnetic substrate 1, which is an insulator.

As a source gas in the CVD method, any conventionally known substances such as silane and ammonia may be used. Moreover, upon generating plasma, He, $N_2$ or the like may be introduced.

A predetermined electrode layer (not shown) may be formed between the non-magnetic substrate 1 and the foundation layer 2 so as to improve the film forming properties of a silicon nitride film.

It is preferred that the electrode layer be formed of a metal material having good electrical conductivity, such as Co, Cu, Ni, Fe, Zr, Pt, Au, Ta, W, Ag, Al, Mn, Cr, Ti, V, Nb, Mo and the like.

Furthermore, a predetermined intermediate layer (not shown) may be formed using a vacuum thin film forming technique between the foundation layer 2 and the magnetic layer 3 described below so as to make the crystal particles in the magnetic layer 3 finer and improve their orientation.

This intermediate layer may be formed of a metal material such as Co, Cu, Ni, Fe, Zr, Pt, Au, Ta, W, Ag, Al, Mn, Cr, Ti, V, Nb, Mo, Ru or the like, an alloy of a combination of two or more of the metal materials mentioned above, a compound of oxygen or nitrogen and any of these metal materials, a compound such as $SiO_2$, silicon nitride, ITO, $In_2O_3$, ZrO or the like.

The magnetic layer 3 is formed by a vacuum thin film forming technique. Examples of vacuum thin film evaporation techniques include physical vapor deposition (PVD) methods such as vacuum evaporation, ion plating, sputtering and the like. In vacuum evaporation, a ferromagnetic metal material is heated and vaporized in a vacuum and is evaporated onto a treated object. In ion plating, a ferromagnetic metal material is vaporized during discharge. In sputtering, glow discharge is caused in an atmosphere, whose main component is argon, so as to sputter the surface atoms of a target with the generated argon ions.

The vacuum evaporation method is advantageous in that it has good film forming properties, high productivity, and is easily operated. The sputtering method is advantageous in that manufacture is easy and in that it has good film forming properties. The ion plating method is advantageous in that control during film growth is easier, and in that it has good film forming properties.

The magnetic recording medium 10 according to an embodiment of the present invention is used with a recording/reproducing device equipped with an MR head or a GMR head. Therefore, in order to reduce noise and improve the C/N (carrier/noise) ratio, it is desirable that the magnetic layer 3 be formed extremely thin, and in particular that it be formed with a thickness of 5 nm to 55 nm.

When the magnetic layer 3 is formed to have a thickness of less than 5 nm, there are cases where a sufficient reproduction output cannot be obtained even with, for example, a high-sensitivity GMR head. On the other hand, when the magnetic layer 3 is formed to have a thickness exceeding 55 nm, there are cases where the desired improvement in recording density cannot be achieved when an MR head or a GMR head is used.

For the magnetic layer 3, any conventionally known metal materials or alloys, which are normally used for forming a magnetic layer in this type of magnetic recording medium, can be used. Examples of such materials include ferromagnetic metals such as Co, Ni and the like, Co—Ni alloys, Co—Fe alloys, Co—Ni—Fe alloys, Co—Cr alloys, Co—Pt alloys, Co—Pt—B alloys, Co—Cr—Pt alloys, Co—Cr—Ta alloys, Co—Cr—Pt—Ta alloys, a film formed of any of these materials in an oxygen atmosphere so that the film contains oxygen, or a substance in which these materials are made to contain one or more other elements.

Further, the magnetic layer 3 may be formed of a granular material such as Co—Pt—$SiO_2$, Co—Pt—$Al_2O_3$, or the like which is obtained by simultaneously growing any of the ferromagnetic materials above and a material, such as $Al_2O_3$, $SiO_2$, $InO_2$, $ZrO_2$ or the like, that is immiscible with these ferromagnetic materials.

The protective layer 4 is made of diamond-like carbon and the like in order to ensure durability and corrosion resistance. The protective layer 4 may be formed in the same manner as the foundation layer 2 described above, that is, by a vacuum thin film forming technique or a plasma CVD method.

On a principal surface of the non-magnetic substrate 1 that is on a side opposite the side on which the magnetic layer 3 is formed, a back coating layer 5 is provided so as to improve the running performance of the magnetic recording medium 10 and to prevent static buildup. It is preferred that the back coating layer 5 have a thickness of 0.2 to 0.7 µm. For example, the back coating layer 5 may be formed by applying a coating on the non-magnetic substrate 1, the coating being prepared by dispersing solid particles, such as an inorganic pigment for example, in a binder and then mixing the binder with an organic solvent selected based on the type of binder used.

Furthermore, it is desirable that the topmost layer on the side on which the magnetic layer 3 is provided and the topmost layer on the side opposite the side on which the magnetic layer 3 is formed be coated with a lubricant or an antirust agent.

The magnetic recording medium 10 according to an embodiment of the present invention is not limited to those in which the magnetic layer 3 is a single-layer. The magnetic layer 3 may also be a multi-layered magnetic layer.

The above-described magnetic recording medium 10 according to an embodiment of the present invention is suitable for use as a magnetic tape for a helical scan magnetic recording system using an MR reproduction head.

Here, MR head refers to a reproduction-only magnetic head, which uses magneto-resistive effects to detect signals from the magnetic recording medium 10. Generally, since MR heads have a higher sensitivity and a larger reproduction output than inductive magnetic heads, which use electromagnetic induction to perform recording and reproduction, MR heads are suitable for high-density recording. Therefore, by using an MR head as a magnetic head for reproduction, higher density recording is made possible.

The MR head is equipped with an approximately rectangular MR element section that is held between a pair of magnetic shields made of a soft magnetic material such as, for example, a Ni—Zn polycrystalline ferrite or the like, through an insulator. A pair of terminals are derived from both ends of the MR element section. A sense current can be supplied to the MR element section through these terminals.

When signals from a magnetic recording medium are reproduced using the MR head, the magnetic recording medium is slid over the MR element section. A sense current is supplied to the MR element section through the terminals connected to both ends of the MR element section while the magnetic recording medium is being slid over the MR element section, thereby detecting changes in the voltage of the sense current. When the sense current is supplied to the MR element section while the magnetic recording medium is being slid over the MR element section, the magnetization direction of the MR element section is changed in accordance with the magnetic field from the magnetic recording medium, thereby changing the relative angle between the sense current supplied to the MR element section and the magnetization direction. As a result, the resistance changes depending on the relative angle formed between the magnetization direction of the MR element section and the direction of the sense current. Therefore, by making the current value of the sense current supplied to the MR element section constant, a change in the voltage of the sense current is generated. By detecting the change in the voltage of the sense current, the magnetic field of the signals from the magnetic recording medium can be detected, and the signals recorded on the magnetic recording medium can be reproduced.

Any element can be used as the MR element of the MR head as long as it demonstrates magneto-resistive effects. For example, a giant magneto-resistive head (GMR head), in which a plurality of thin films are layered so as to obtain larger magneto-resistive effects, can be used.

As a method of applying a bias magnetic field to the MR element, various methods besides a SAL biasing method can be used. For example, a permanent-magnet biasing method, a shunt current biasing method, a self-biasing method, an exchange biasing method, a barber pole method, a divided element method, a servo biasing method and the like can be used.

Giant magneto-resistive effects and various biasing methods are described in detail in, for example, "Magneto-Resistive and Spin Valve Heads: Fundamentals and Applications" by John C. Mallinson.

Next, another example of a magnetic recording medium according to the present invention will be described with reference to FIG. 2.

Figure 2:
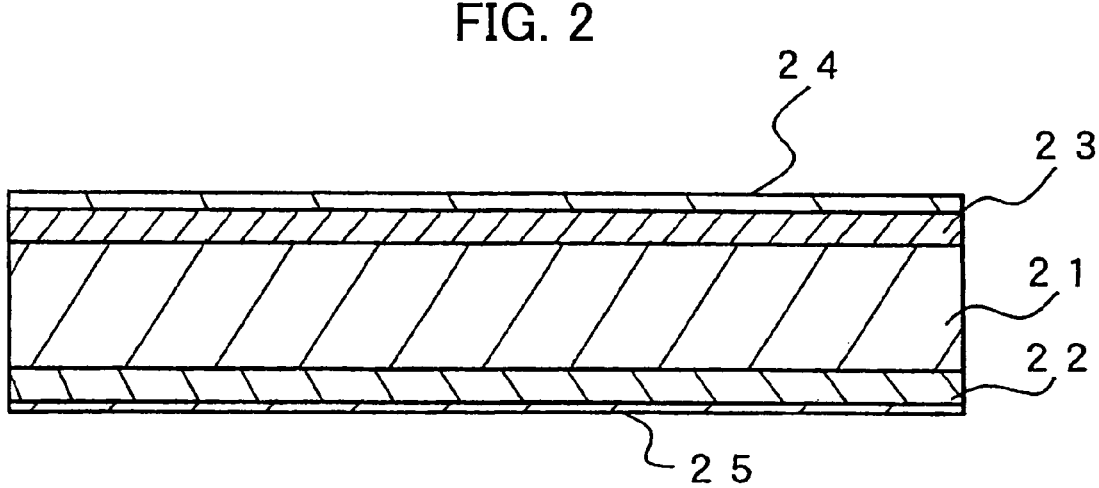
FIG. 2 is a schematic configuration diagram of another example of a magnetic recording medium according to the present invention.

A magnetic recording medium 20 shown in FIG. 2 includes a non-magnetic substrate 21, and on a principal surface of the non-magnetic substrate 21 are formed a magnetic layer 23 and a protective layer 24. On a principal surface on a side opposite the side on which the magnetic layer 23 is formed are successively formed a back foundation layer 22 made of a silicon nitride film having a thickness of 2 nm to 200 nm and a back coating layer 25.

It is assumed that the magnetic recording medium 20 is used in a sliding state in relation to, in particular, a magneto-resistive head (MR head) or a giant magneto-resistive head (GMR head).

Hereinafter, each of the layers constituting the magnetic recording medium 20 will be described.

Since configurations similar to those of the non-magnetic substrate 1, the magnetic layer 3 and the protective layer 4 of the magnetic recording medium 10 shown in FIG. 1 described above can be used for the non-magnetic substrate 21, the magnetic layer 23 and the protective layer 24, respectively, descriptions thereof are herein omitted.

The magnetic recording medium 20 shown in FIG. 2 is characteristic particularly in that the back foundation layer 22 is formed on the principal surface on the side opposite the side on which the magnetic layer 23 is formed.

The back foundation layer 22 may be a silicon nitride film having a thickness of 2 nm to 200 nm.

The back foundation layer 22 serves as a shield layer for preventing the corrosion of the magnetic layer 23 and also serves to prevent changes in the shape of a magnetic tape during long-term storage. The back foundation layer 22 may be formed by a vacuum thin film forming technique.

Examples of vacuum thin film forming techniques include physical vapor deposition (PVD) methods such as sputtering and reactive sputtering. In sputtering, glow discharge is caused in an atmosphere, whose main component is argon, so as to sputter the surface atoms of a target made of silicon nitride with the generated argon ions. In reactive sputtering, glow discharge is caused in an atmosphere, whose main components are argon and nitrogen, so as to sputter and nitride the surface atoms of a target made of silicon with the generated argon or nitrogen ions. PVD methods are advantageous in that film formation is easy and in that they have good film forming properties.

Alternatively, the back foundation layer 22 may also be formed by a chemical vapor deposition (CVD) method using, for example, a plasma CVD continuous film formation device.

As a CVD method, any one of conventionally known methods such as a mesh electrode DC plasma method, an electron beam excitation plasma source method, a cold-cathode ion source method, an ion vapor deposition method, a catalytic CVD method and the like may be used. The mesh electrode DC plasma method is advantageous in that it is superior in terms of film growth rate although this method requires an electrode layer on the non-magnetic substrate 21 for allowing a film forming current to flow. The electron beam excitation plasma source method, the cold-cathode ion source method, the ion vapor deposition method, and the catalytic CVD method are advantageous in that an electrode layer is not required and therefore in that a film can be formed directly on the non-magnetic substrate 21, which is an insulator.

As a source gas in the CVD methods, any conventionally known materials such as silane, ammonia and the like may be used. Moreover, at the time of plasma generation, He, $N_2$ or the like may be introduced.

A predetermined electrode layer (not shown) may be formed between the non-magnetic substrate 21 and the back foundation layer 22 so as to improve film formation properties of the silicon nitride film.

It is preferred that the electrode layer be formed of a metal material having good electrical conductivity, such as Co, Cu, Ni, Fe, Zr, Pt, Au, Ta, W, Ag, Al, Mn, Cr, Ti, V, Nb, Mo and the like.

A back coating layer 25 is provided on the back foundation layer 22 so as to improve the running performance of the magnetic recording medium 20 and to prevent static buildup. It is preferred that the back coating layer 25 have a thickness of 0.2 to 0.7 μm. For example, the back coating layer 25 may be formed by applying a coating onto the non-magnetic substrate 21, the coating being prepared by dispersing solid particles, such as an inorganic pigment, in a binder and then mixing the binder with an organic solvent selected based on the type of binder used.

Furthermore, it is desirable that the topmost layer on the side on which the magnetic layer 23 is provided and the topmost layer on the side opposite the side on which the magnetic layer 23 is formed be coated with a lubricant or an antirust agent.

The magnetic recording medium 20 according to an embodiment of the present invention is not limited to a single-layered magnetic layer 23, and the magnetic layer 23 may also be a multi-layered magnetic layer.

As in the magnetic recording medium 10 shown in FIG. 1, the above-described magnetic recording medium 20 shown in FIG. 2 is suitable for use as a magnetic tape for a helical scan magnetic recording system that uses an MR reproduction head. The magnetic recording medium 20 makes it possible to reproduce information signals using an MR head or a GMR head having similar configurations.

Although the magnetic recording medium 10 including the foundation layer 2 formed between the non-magnetic substrate 1 and the magnetic layer 3 as shown in FIG. 1 and the magnetic recording medium 20 including the back foundation layer 22 formed between the non-magnetic substrate 21 and the back coating layer 25 are independently described above, the present invention is not limited thereto. The foundation layer 2 in FIG. 1 and the back foundation layer 22 in FIG. 2 may both be formed in a single magnetic recording medium. In this case, however, it is necessary to control the thicknesses of the foundation layer 2 and the back foundation layer 22 so as to prevent occurrences of dimensional change in the magnetic tape.

EXAMPLES

Next, the magnetic recording medium according to an embodiment of the present invention will be described with specific examples and comparative examples. However, the magnetic recording medium according to the present invention is not limited to the following examples.

Example A

In the following examples, magnetic recording media, each having the configuration shown in FIG. 1, were produced.

Example A1

As the non-magnetic substrate 1, a polyethylene terephthalate (PET) film having a thickness of 6.3 μm and a width of 150 mm was prepared.

First, a coating layer having a thickness of 5 nm was formed on a side of the non-magnetic substrate 1 on which the magnetic layer is formed. The coating layer was formed by mixing silica particles of a diameter of 10 nm in water-based latex, whose main component is acryl ester, and applying it onto the non-magnetic substrate 1 such that the density was about $1 \times 10^7 / mm^2$.

Figure 3:
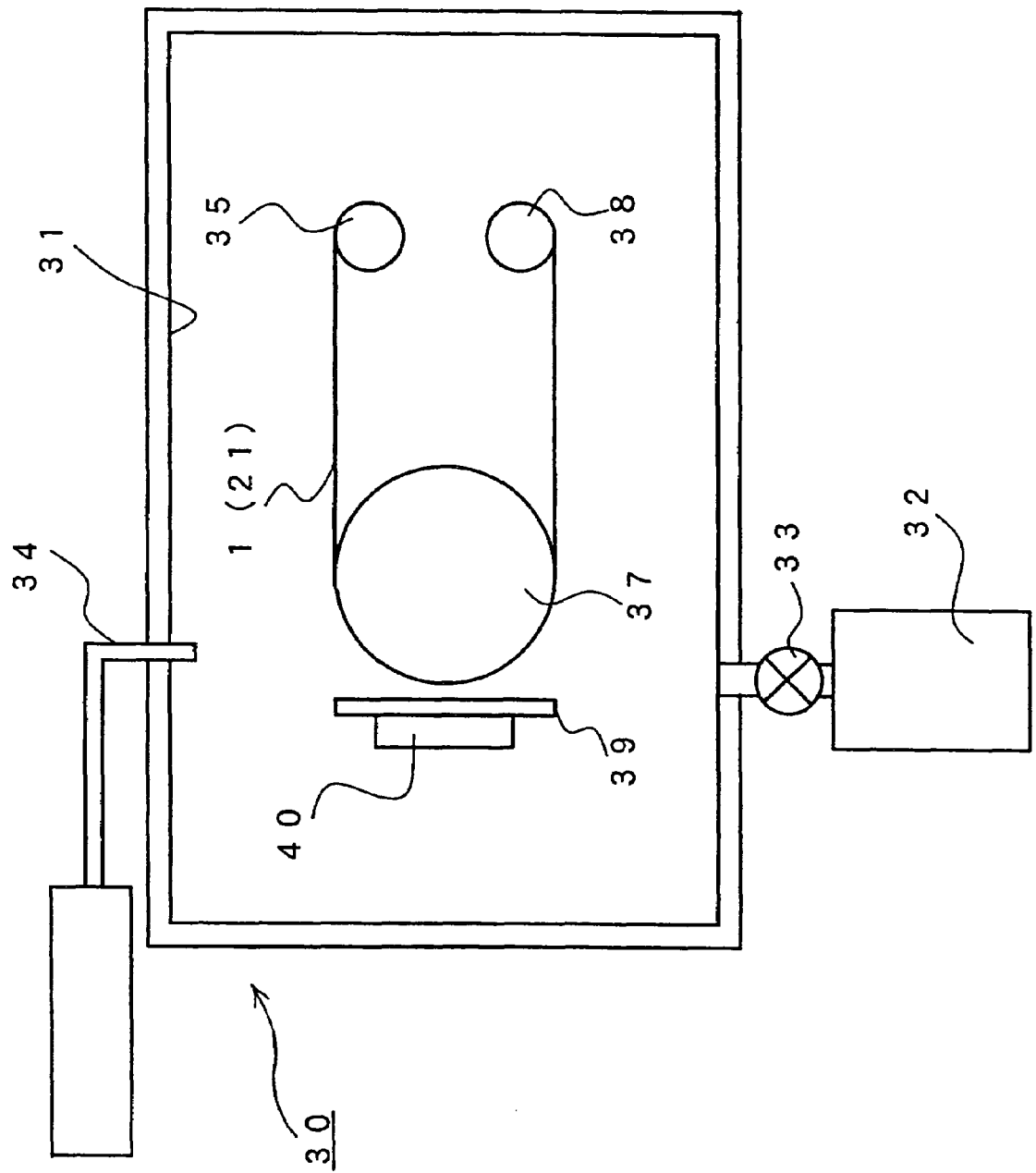
FIG. 3 is a schematic configuration diagram of a magnetron sputtering device for forming a foundation layer and a back foundation layer.

Next, the foundation layer 2 made of a silicon nitride film was formed to have a thickness of 2 nm on the non-magnetic substrate 1 through sputtering using a magnetron sputtering device 30 shown in FIG. 3.

Specifically, in the magnetron sputtering device 30, the pressure of a space enclosed by a chamber 31 was reduced to $10^{-4}$ Pa by a vacuum pump 32. Thereafter, the angle of a valve 33 for exhausting air toward the vacuum pump 32 is reduced from a fully open state to 10 degrees to lower the pumping speed. An Ar gas was introduced through a gas introduction tube 34 so as to set the degree of vacuum to 0.8 Pa. Then, the non-magnetic substrate 1 was set on a feed roll 35, was made to run along a peripheral surface of a cooling can 37 cooled to −40° C., and was wound around a take-up roll 38.

Then, a voltage of 3000 V was applied to an electrode 39 and a target 40 made of silicon nitride ($Si_3N_4$), which were positioned opposite the cooling can 37 at a distance of about 45 nm, so as to maintain a condition in which a current of 1.4 A was flowing. Thus, a silicon nitride film serving as the foundation layer 2 was formed on the non-magnetic substrate 1. The thickness of the silicon nitride film was controllable as a function of the film growth time.

Next, the magnetic layer 3 was formed using a conventionally known vacuum evaporation equipment. The metal magnetic material for the magnetic layer 3 was Co. Oxygen was introduced from an oxygen gas introduction tube at $6.0 \times 10^{-4}$ m$^3$/min. An electron beam was radiated from an electron gun for heating so as to form a Co/CoO type magnetic layer 3 with a thickness of 50 nm by reactive vacuum evaporation. In so doing, the minimum incident angle of the evaporated Co particles was adjusted to 45° and the maximum incident angle to 90° with a shutter.

Next, the protective layer 4 made of diamond-like carbon was formed on the magnetic layer 3. The protective layer 4 made of diamond-like carbon was formed to have a thickness of 10 nm by a plasma CVD method.

Next, a lubricant layer was formed by applying perfluoropolyether, such that the thickness became 2 nm, onto the protective layer 4 made of diamond-like carbon.

In order to ensure durability, the back coating layer 5 was formed on a side opposite the side on which the magnetic layer 3 was formed. The back coating layer 5 was formed such that it has a thickness of 0.5 μm by means of an application device through a direct gravure method. The back coating contained carbon particles as an inorganic pigment having a mean diameter of 20 nm, and a urethane resin.

Finally, the original magnetic recording medium produced as described above was cut in widths of 8 mm, and sample magnetic tapes were obtained. The obtained tapes are the sample of example A1.

Example A2

Sample magnetic tapes were produced under conditions similar to example A1 described above except in that the foundation layer 2 was formed with a thickness of 25 nm.

Example A3

Sample magnetic tapes were produced under conditions similar to example A1 described above except in that the foundation layer 2 was formed with a thickness of 50 nm.

Example A4

Sample magnetic tapes were produced under conditions similar to example A1 described above except in that a carbon film having a thickness of 25 nm was formed as the foundation layer 2 through plasma CVD.

Comparative Example A1

Sample magnetic tapes were produced under conditions similar to example A1 described above except in that the foundation layer 2 was not formed.

Comparative Example A2

Sample magnetic tapes were produced under conditions similar to example A1 described above except in that the foundation layer 2 was formed with a thickness of 1 nm.

Comparative Example A3

Sample magnetic tapes were produced under conditions similar to example A1 described above except in that the foundation layer 2 was formed with a thickness of 75 nm.

Comparative Example A4

Sample magnetic tapes were produced under conditions similar to example A1 described above except in that a Cu film with a thickness of 50 nm was formed as the foundation layer 2 through sputtering.

Each of the thus produced sample magnetic tapes was evaluated for corrosion resistance and electromagnetic conversion characteristics by the following method.

Corrosion resistance was evaluated based on the degradation rate in magnetization of the magnetic layer 3 after a corrosion test. The degradation rate in magnetization was obtained in the following manner. A sample magnetic tape was left for 144 hours in an environment of 65° C. and of 90% relative humidity, and $M_{s0}$ (saturation magnetization) before the test and $M_{s1}$ (saturation magnetization) after the test were measured. Then, the degradation rate in magnetization was calculated with the following equation:

Degradation rate in magnetization (%)=
$((M_{s0}-M_{s1})/M_{s0}) \times 100$     (1)

Electromagnetic conversion characteristics were measured using a drum tester. An MR head having a track width of 5 μm was used as a magnetic head for reproduction, and the ratio of carrier output to media noise (CNR) at a recording wavelength of 0.5 μm was measured.

The evaluation results for the degradation rates in magnetization (%) and the electromagnetic characteristics of examples A1 to A4 and comparative examples A1 to A4 described above are shown in. Table 1 below.

In practice, it is desirable that the degradation rate in magnetization be 15% or less. For electromagnetic characteristics (CNR), a value of the sample of comparative example 1 in which the foundation layer 2 was not formed was taken as a reference, and the samples whose electromagnetic characteristics were within a range of −1.0 dB from this reference value were deemed suitable for practical use.

TABLE 1

| | Foundation layer | Film formation method | Thickness of foundation layer (mm) | Degradation rate (%) | CNR (dB) |
|---|---|---|---|---|---|
| Example A1 | Silicon nitride | Sputtering | 2 | 14 | 0.0 |
| Example A2 | Silicon nitride | Sputtering | 25 | 6 | −0.3 |
| Example A3 | Silicon nitride | Sputtering | 50 | 3 | −1.0 |
| Example A4 | Carbon | Plasma CVD | 25 | 7 | −0.3 |
| Comparative Example A1 | None | None | 0 | 25 | Ref. |
| Comparative Example A2 | Silicon nitride | Sputtering | 1 | 20 | 0.0 |
| Comparative Example A3 | Silicon nitride | Sputtering | 75 | 3 | −1.2 |
| Comparative Example A4 | Cu | Sputtering | 50 | 14 | −1.9 |

As shown in Table 1, for each of the sample magnetic tapes of examples A1 to A4 in which the foundation layer 2 was formed with a thickness of 2 to 50 nm, good corrosion resistance was realized while suppressing the degradation in electromagnetic conversion characteristics within −1.0 dB.

Although the foundation layer 2 of the sample magnetic tape of example A4 was formed in a method different from examples A1 to A3, as good a corrosion resistance as examples A1 to A3 was obtained. Thus, it was found that the foundation layer 2 is not limited to a silicon nitride film and that any other material may be used as long as it demonstrates functions of a shield layer for the magnetic layer 3.

In the sample magnetic tape of comparative example A1, sufficient corrosion resistance could not be obtained due to the absence of the foundation layer 2.

In the sample magnetic tape of comparative example A2, sufficient coverage could not be obtained because the thickness of the foundation layer 2 was made to be 1 nm, which is thinner than 2 nm. As a result, desired improvements in corrosion resistance could not be obtained.

In the sample magnetic tape of comparative example A3, the roughness of the surface of the magnetic layer 3 became larger because the thickness of the foundation layer 2 made of silicon nitride was made to be 75 nm, which is thicker than 50 nm. As a result, medium noise was increased and electromagnetic conversion characteristics were degraded.

In the sample magnetic tape of comparative example A4, the foundation layer 2 was formed of a metal film with a thickness of 50 nm, and although a predetermined corrosion resistance could be obtained, the roughness of the surface of the magnetic layer 3 increased. As a result, medium noise increased and electromagnetic conversion characteristics were degraded.

Example B

In the following examples, magnetic recording media, each having the configuration shown in FIG. 2, were produced.

Example B1

As the non-magnetic substrate 21, a polyethylene terephthalate (PET) film having a thickness of 6.3 μm and a width of 150 mm was prepared.

First, a coating layer having a thickness of 5 nm was formed on the surface of the non-magnetic substrate 21 on which the magnetic layer 23 was later formed. The coating layer was formed by mixing silica particles of a diameter of 10 nm in water-based latex, whose main component is acryl ester, and applying it onto the non-magnetic substrate 21 such that the density was about $1 \times 10^7/\text{mm}^2$.

Next, the back foundation layer 22 made of a silicon nitride film was formed, by sputtering, to have a thickness of about 2 nm on the side of the non-magnetic substrate 21 opposite the side on which the magnetic layer 23 was later formed.

Specifically, in the magnetron sputtering device 30 shown in FIG. 3, the pressure of a space enclosed by the chamber 31 was reduced to $10^{-4}$ Pa by the vacuum pump 32. Thereafter, the angle of the valve 33 for exhausting air toward the vacuum pump 32 was reduced from a fully open state to 10 degrees to lower the pumping speed. An Ar gas was introduced through the gas introduction tube 34 so as to set the degree of vacuum to 0.8 Pa. Then, the non-magnetic substrate 21 was set on the feed roll 35, was made to run along the peripheral surface of the cooling can 37 cooled to −40° C., and was wound around the take-up roll 38.

Then, a voltage of 3000 V was applied to the electrode 39 and the target 40 made of silicon nitride ($Si_3N_4$), which were positioned opposite the cooling can 37 at a distance of about 45 nm so as to maintain a condition in which a current of 1.4 A was flowing. Thus, a silicon nitride film serving as the foundation layer 22 was formed on the non-magnetic substrate 21. The thickness of the silicon nitride film was controllable as a function of the film growth time.

Next, the magnetic layer 23 was formed using a conventionally known vacuum evaporation equipment. The metal magnetic material for the magnetic layer 23 was Co. Oxygen was introduced from an oxygen gas introduction tube at $6.0 \times 10^{-4}$ m$^3$/min. An electron beam was radiated from an electron gun for heating so as to form a Co/CoO type magnetic layer 23 with a thickness of 50 nm by reactive vacuum evaporation. In so doing, the minimum incident angle of the evaporated Co particles was adjusted to 45° and the maximum incident angle to 90° with a shutter.

Next, the protective layer 24 made of diamond-like carbon was formed on the magnetic layer 23. The protective layer 24 made of diamond-like carbon was formed to have a thickness of 10 nm by plasma CVD.

Next, a lubricant layer was formed by applying perfluoropolyether, such that the thickness became 2 nm, onto the protective layer 4 made of diamond-like carbon.

In order to ensure durability, the back coating layer 25 was formed on a side opposite the side on which the magnetic layer 3 was formed. The back coating layer 5 was formed such that it has a thickness of 0.5 μm by means of an application device through a direct gravure method. The back coating contained carbon particles as an inorganic pigment having a mean diameter of 20 nm, and a urethane resin.

Finally, the original magnetic recording medium produced as described above was cut into widths of 8 mm, and sample magnetic tapes were obtained. The obtained tapes are the sample of example B1.

Example B2

Sample magnetic tapes were produced under conditions similar to example B1 described above except in that the back foundation layer 22 was formed with a thickness of 100 nm.

Example B3

Sample magnetic tapes were produced under conditions similar to example B1 described above except in that the back foundation layer 22 was formed with a thickness of 200 nm.

Example B4

Sample magnetic tapes were produced under conditions similar to example B1 described above except in that the silicon nitride layer was formed with a thickness of 100 nm by plasma CVD as the back foundation layer 22.

Example B5

Sample magnetic tapes were produced under conditions similar to example B1 described above except in that the back foundation layer 22 was formed with a thickness of 100 nm and in that the back coating layer 25 was not formed.

Comparative Example B1

Sample magnetic tapes were produced under conditions similar to example B1 described above except in that the back foundation layer 22 was not formed.

Comparative Example B2

Sample magnetic tapes were produced under conditions similar to example B1 described above except in that the back foundation layer 22 was formed with a thickness of 1 nm.

Comparative Example B3

Sample magnetic tapes were produced under conditions similar to example B1 described above except in that the back foundation layer 22 was formed with a thickness of 250 nm.

Comparative Example B4

Sample magnetic tapes were produced under conditions similar to example B1 described above except in that a foundation layer having a thickness of 100 nm was formed on the side of the non-magnetic substrate 21 on which the magnetic layer was formed and in that the back foundation layer 22 was not formed.

Comparative Example B5

Sample magnetic tapes were produced under conditions similar to example B1 described above except in that a Cu film was formed with a thickness of 200 nm by sputtering as the back foundation layer 22.

Each of the thus produced sample magnetic tapes was evaluated for corrosion resistance and mechanical dimensional changes by the following method.

Corrosion resistance was evaluated based on the degradation rate in magnetization of the magnetic layer 23 after a corrosion test. The degradation rate in magnetization was obtained as follows. A sample magnetic tape was left for 144 hours in an environment of 65° C. and 90% relative humidity, and $M_{s0}$ (saturation magnetization) before the test and $M_{s1}$ (saturation magnetization) after the test were measured. Then, the degradation rate in magnetization was calculated with the following equation.

$$\text{Degradation rate in magnetization (\%)} = ((M_{s0}-M_{s1})/M_{s0}) \times 100 \qquad (2)$$

Figure 4:
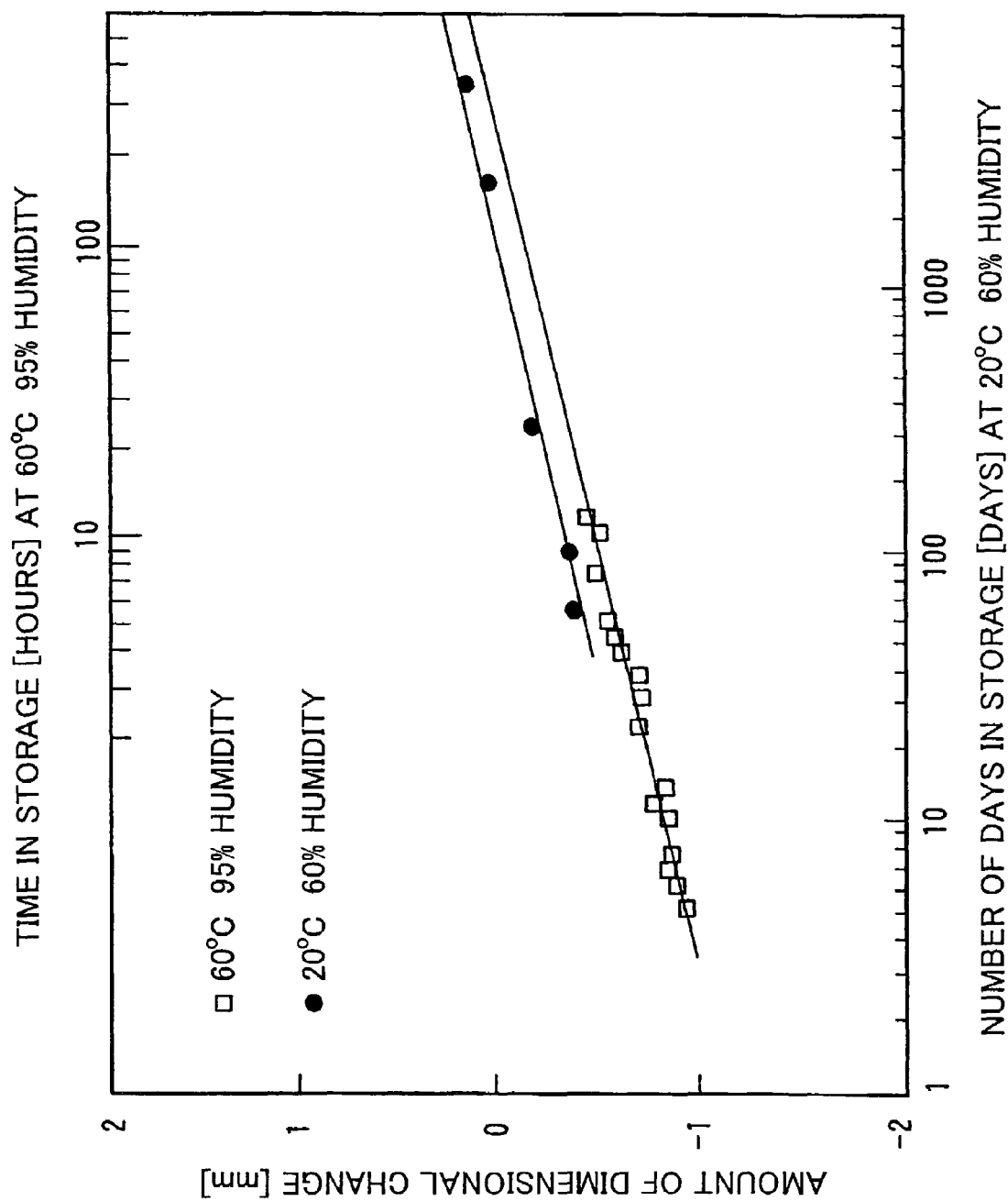
FIG. 4 is a graph showing the time in storage under accelerated conditions and the corresponding number of days in storage under ambient conditions.

With respect to mechanical dimensional changes, certain accelerated conditions for storing a magnetic recording medium were set for this evaluation. FIG. 4 shows the amount of dimensional change when stored under a temperature of 60° C. and 95% humidity and the corresponding storage time (days) when stored at 20° C. and 60% humidity. As can be seen from FIG. 4, a magnetic tape stored at a temperature of 60° C. and a humidity of 95% for 144 hours is in a state comparable to a magnetic tape stored at a temperature of 20° C. and a humidity of 60% for about 6.5 years, and that a magnetic tape stored at a temperature of 60° C. and a humidity of 95% for 255 hours is in a state comparable to a magnetic tape stored at a temperature of 20° C. and a humidity of 60% for about 15 years.

Figure 5:
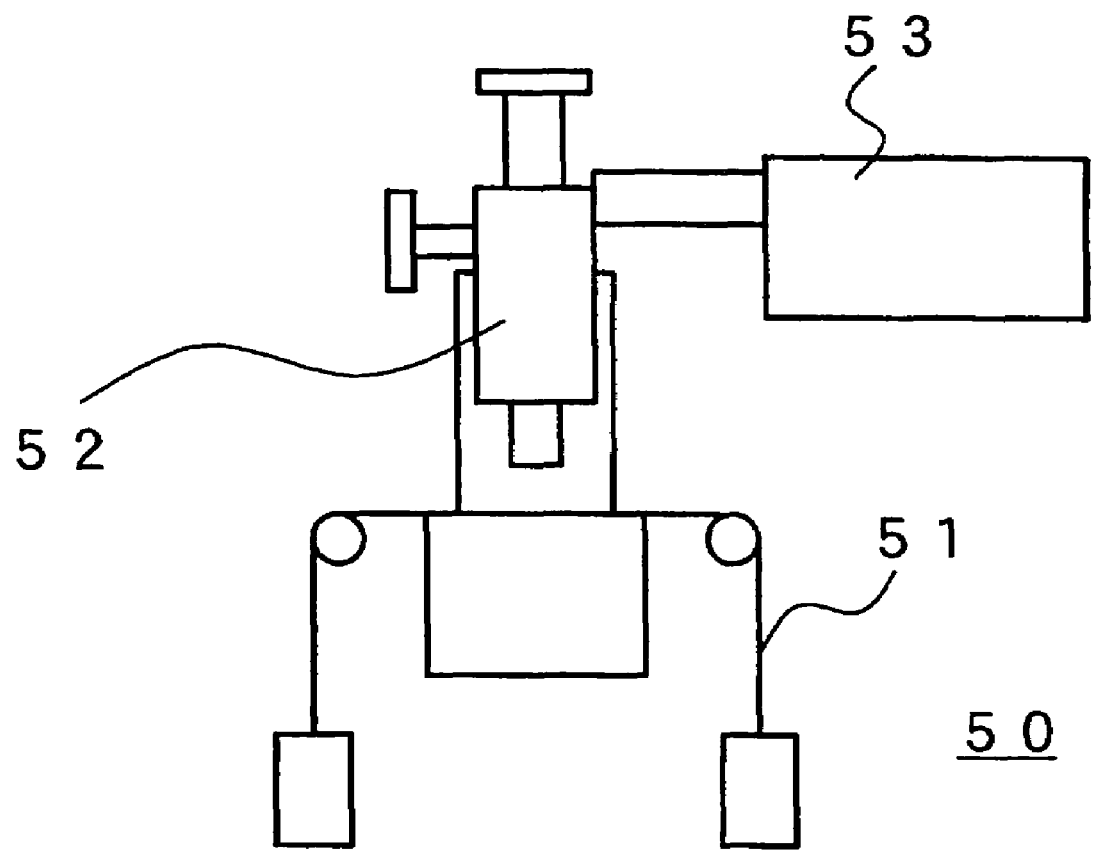
FIG. 5 is a schematic configuration diagram of a cupping measuring device for a magnetic tape.

The change in the amount of cupping was taken to be an index for the amount of change in mechanical dimensions, and was measured with a cupping measurement device 50 shown in FIG. 5. Specifically, an optical microscope 52 was focused at a magnification of 100 on a central portion and an edge portion of a magnetic tape sample 51. After a predetermined storage time elapsed, the difference in height between the central portion and the edge portion was read by a micrometer 53 coupled with a stage of the optical microscope 52 that is movable in the up down direction. With the magnetic layer side facing upward, negative cupping is when the side of the magnetic layer is in a convex state, and positive cupping is when the side of the magnetic layer is in a concave state.

The evaluation results for the degradation rate in magnetization (%) and the amount of dimensional change (mm) of examples B1 to B5 and comparative examples B1 to B5 described above are shown in table 2 below.

In practice, it is desirable that the degradation rate in magnetization be 15% or less. With respect to the amount of dimensional change, a value within a range of −0.5 mm to +0.5 mm was deemed suitable for practical use.

TABLE 2

|  | Back foundation layer | Film formation method | Thickness of back foundation layer (mm) | Degradation rate (%) | Amount of dimensional change |
|---|---|---|---|---|---|
| Example B1 | Silicon nitride | Sputtering | 2 (back face side) | 14 | 0.40 |
| Example B2 | Silicon nitride | Sputtering | 100 (back face side) | 8 | 0.05 |
| Example B3 | Silicon nitride | Sputtering | 200 (back face side) | 3 | −0.45 |
| Example B4 | Silicon nitride | Plasma CVD | 100 (back face side) | 7 | 0.05 |
| Example B5 | Silicon nitride | Sputtering | 100 (back face side) | 10 | 0.10 |
| Comparative Example B1 | None | None | 0 (back face side) | 25 | 0.45 |
| Comparative Example B2 | Silicon nitride | Sputtering | 1 (back face side) | 20 | 0.40 |
| Comparative Example B3 | Silicon nitride | Sputtering | 250 (back face side) | 3 | −0.85 |
| Comparative Example B4 | Silicon nitride | Sputtering | 100 (magnetic layer side) | 2 | 0.90 |
| Comparative Example B5 | Cu | Sputtering | 200 (back face side) | 16 | −1.05 |

As shown in table 2, in each of the sample magnetic tapes of examples B1 to B5 in which the back foundation layer 22 was formed with a thickness of 2 to 200 nm, good corrosion resistance could be realized while suppressing the amount of dimensional change within ±0.5 mm, which is a good range for practical purposes.

Although the back foundation layer 22 of the sample magnetic tape of example B4 was produced through a method different from examples B1 to B3 and example B5, comparable corrosion resistance was obtained. Based on this result, it is found that good dimensional stability and good corrosion resistance can be obtained regardless of the method in which the back foundation layer 22 is formed.

Moreover, even in the sample magnetic tape of example B5 where the back coating layer 25 was not formed, good corrosion resistance could be obtained while suppressing the amount of dimensional change within ±0.5 mm. Based on this result, it was found that the back foundation layer 22 functioned effectively as a shield layer.

In the sample magnetic tape of comparative example B1, sufficient corrosion resistance could not be obtained due to the absence of the back foundation layer 22.

In the sample magnetic tape of comparative example B2, sufficient coverage could not be obtained because the thickness of the back foundation layer 22 was made to be 1 nm, which is less than 2 nm. As a result, desired improvements in corrosion resistance could not be obtained.

In the sample magnetic tape of comparative example B3, deformation in the magnetic tape was caused due to the fact that the thickness of the back foundation layer 22 was made to be 250 nm, which is greater than 200 nm. As a result, the amount of dimensional change was increased in the negative direction, and the desired improvements in storability could not be obtained.

In the sample magnetic tape of comparative example B4, the back foundation layer 22 was not formed, and the foundation layer, as in the magnetic recording medium shown in FIG. 1, was formed with a thickness of 100 nm on the side on which the magnetic layer was formed. As a result, the magnetic tape was deformed, dimensional change in the positive direction increased, and the desired improvements in storability could not be obtained.

In the sample magnetic tape of comparative example B5, the back foundation layer 22 was formed of a metal film with a thickness of 200 nm for the purpose of obtaining the desired corrosion resistance. However, the amount of dimensional change increased in the negative direction, the desired improvements in storability could not be obtained, and the desired improvements in corrosion resistance could not be obtained.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A magnetic recording medium, comprising:
   an elongate non-magnetic substrate;
   a foundation layer formed by a vacuum thin-film forming technique over said non-magnetic substrate;
   a magnetic layer having a thickness of 55 nm or less formed by a vacuum thin film forming technique over said non-magnetic substrate such that the magnetic layer does not include a non-magnetic binder, and
   said foundation layer is formed of a silicon nitride film having a thickness of 2 nm to 50 nm and further wherein the substrate is comprised of PET; and
   further comprising an electrode layer between the non-magnetic substrate and the foundation layer.

2. A magnetic recording medium, comprising:
   an elongate non-magnetic substrate;
   a magnetic layer having a thickness of 55 nm or less formed by a vacuum thin film evaporation technique over one principal surface of said non-magnetic substrate such that the magnetic layer does not include a non-magnetic binder; and
   a back foundation layer formed by a vacuum thin-film forming technique over a principal surface of said non-magnetic substrate on a side opposite said magnetic layer, wherein, and
   said back foundation layer is formed of a silicon nitride film and further wherein the substrate is comprised of PET and further comprising a back coating layer over the back foundation layer; and
   further comprising an electrode layer between the non-magnetic substrate and the back foundation layer.

3. The magnetic recording medium according to claim 2, wherein said back foundation layer is formed of a silicon nitride film having a thickness of 2 nm to 200 nm.

4. The magnetic recording medium according to claim 2, wherein said back foundation layer and a back coating layer are formed in layers over said principal surface of said non-magnetic substrate on the side opposite the side on which said magnetic layer is formed.

* * * * *